US006023684A

United States Patent [19]
Pearson

[11] Patent Number: 6,023,684
[45] Date of Patent: Feb. 8, 2000

[54] THREE TIER FINANCIAL TRANSACTION SYSTEM WITH CACHE MEMORY

[75] Inventor: Mark P. Pearson, Atlanta, Ga.

[73] Assignee: Security First Technologies, Inc., Atlanta, Ga.

[21] Appl. No.: 08/941,966

[22] Filed: Oct. 1, 1997

[51] Int. Cl.[7] ............................. G06F 17/30; G06F 17/60
[52] U.S. Cl. ............................... 705/35; 705/36; 705/42; 707/10; 395/200.8
[58] Field of Search .................................. 705/35, 36, 42; 707/9, 10, 102, 516, 103; 395/280, 500, 200.3, 200.7, 200.8, 200.33, 200.63, 836; 709/224, 228

[56] References Cited

U.S. PATENT DOCUMENTS

| | | | |
|---|---|---|---|
| 4,891,503 | 1/1990 | Jewell | 235/380 |
| 5,109,413 | 4/1992 | Comerford et al. | 380/4 |
| 5,222,133 | 6/1993 | Chou et al. | 380/4 |
| 5,311,591 | 5/1994 | Fischer | 380/4 |
| 5,343,526 | 8/1994 | Lassers | 380/4 |
| 5,473,692 | 12/1995 | Davis | 380/25 |
| 5,493,649 | 2/1996 | Slivka et al. | 395/185.01 |
| 5,535,407 | 7/1996 | Yanagawa et al. | 705/39 |
| 5,559,884 | 9/1996 | Davidson et al. | 380/4 |
| 5,560,008 | 9/1996 | Johnson et al. | 395/680 |
| 5,754,830 | 5/1998 | Butts et al. | 395/500 |
| 5,835,908 | 11/1998 | Bennett et al. | 707/10 |
| 5,841,970 | 11/1998 | Tabuki | 395/178.01 |
| 5,842,211 | 11/1998 | Horadan et al. | 707/10 |
| 5,848,246 | 12/1998 | Gish | 395/200.58 |
| 5,864,683 | 1/1999 | Boebert et al. | 395/200.79 |

FOREIGN PATENT DOCUMENTS

PCT/US96/
16567  4/1997  WIPO .

OTHER PUBLICATIONS

The Engineering Back Office, Executive Overview (http://www.bentley.com/news/white/engineering–backoffice-.html), no date.

"Distributed Database Access in a Corporate Envirnoment Using Java"; Computer Networks and ISDN Systems; Nick N. Duan, pp. 1149–1156; 1996.

"Mainframes as High Volume TP Servers for the Web"; IEEE; David A. Williamson; pp. 129–137; 1997.

"Constructing Reliable Web Applications Using Atomic Actions"; Computer Networks and ISDN Systems; pp. 1281–1290; 1997.

*Primary Examiner*—Emmanuel Todd Volltz
*Assistant Examiner*—John W. Hayes
*Attorney, Agent, or Firm*—King & Spalding

[57] ABSTRACT

A three tier financial transaction system having a local data memory is disclosed. The three tier system includes a client interface, an application service, a host interface, and a local data memory. The client interface communicates data messages between a client program and the financial transaction system. The client interface converts client requests to a format compatible with the application service so the application service may process client requests from client programs. At the initiation of a logical session with a client program, the application service refreshes data for the customer associated with the client program using data obtained from a back end processing system through the host interface. The data in the local data memory is then used by the application service for processing client requests during the logical session. Response data generated by the application service is provided to the client interface for presentation to the client program. Communication between the client program and the client interface is preferably performed over an open communication network. The local data memory permits the processing of the client service request to be decoupled from the updating of the back end processing system to improve response times for client request processing.

20 Claims, 4 Drawing Sheets

THREE TIER FINANCIAL TRANSACTION SYSTEM WITH CACHE MEMORY

FIELD OF THE INVENTION

This invention relates to customer access to records maintained on financial institution account systems, and more particularly, to systems for interfacing client programs over an open network to legacy databases in financial institution computer systems.

BACKGROUND OF THE INVENTION

Computer systems which permit customers to obtain information about their individual financial accounts or to direct financial transactions involving their accounts are known. In one type of previously known systems, a main frame computer controls access to financial institution accounts and maintains a database of financial transaction information for its customers. The database management systems in these types of financial systems are typically proprietary and many are not compliant with known standards for Relational Data Base Management Systems ("RDBMS"). Transaction data is typically provided to these types of database management systems from terminals at teller locations, front-end processors for automated teller machines, or other machines which read checks or other financial instruments to convert data to a form compatible with the database management system.

To permit users to access a database in this type of system, multiple telephone lines coupled with voice-response units (VRUs) are provided. The voice response units, in turn, are coupled to front-end processors for controlling communications between a main frame computer and the VRUs. To access account information, a customer makes a telephone call using a touch-tone telephone to one of the telephone lines coupled to a VRU. The voice response unit provides an audio menu from which a customer selects an entry by depressing a button corresponding to the entry on the user's touch tone telephone. By traversing a menu structure in this manner, a user can generate a query for an account balance, last transaction, or other financial information obtained in the user's account. The voice response unit provides the selected request or command to the front-end processor which converts the data message to a format compatible with the database management system on the mainframe computer. Once the data was retrieved, it is returned to the front-end processor, provided to the voice response unit for conversion to audio information, and provided over the telephone line to the user.

These systems suffered from a number of limitations. For one, users have to remember all menu selections provided by the voice response unit. Likewise, users have to write down the information that was provided over the voice response units for their records. In addition, the entry of data is more cumbersome because users only have ten or twelve keys available for input.

In an effort to overcome these and other limitations of the voice response systems, systems were developed in which a user could use a personal computer ("PC") and a modem to communicate with computers at the financial institution. In this type of system, the customer is provided with a program which the user loads on his or her PC. This program facilitates the user's control of the computer's communication controller to call the financial institution using the PC's modem. At the financial institution, the telephone lines are provided with modems for communicating messages from the user's PC to a communication processor. The communication processor controls the interaction with the user. The menu selections are either generated by the program at the user's computer or downloaded from the communication processor for display at the user's computer. This visual display facilitates the user's interaction with the system. In addition, the PC keyboard provides the user with a more versatile component for entering data. Also, data retrieved from the database and provided from the front-end processor to the communication processor can be down-loaded to the user's PC and displayed. The user can then store the information in the user's computer memory or print the information.

While this type of system overcomes limitations of previously known systems which utilize audio methods, it still requires a user to make a telephone call to the financial institution in order to be coupled to the financial institution's computer system. When the user is in an area outside the local calling area of the computer system, a long distance telecommunication charge is incurred. If the amount of information to be downloaded is substantial, the charges may be significant. Another limitation of these systems is the requirement that the financial institution provide at a nominal or no charge, a computer program for the user to load onto his or her PC. As the installation of a computer program requires more knowledge about a user's PC than some users know, customer frustration arises during efforts to load the financial institution communication program onto a user's PC. In order to provide support for these users, the financial institutions have to contract or employ computer professionals for providing telephone assistance to these users. These overhead costs may be significant for the financial institutions.

Within the last decade, the Internet has become a more commonly used form of computer communication. The Internet is a network of computer networks, all of which communicate in a standard communication protocol. Information is routed through these networks by computers known as routers which translate mnemonic addresses to Internet protocol addresses. One communication protocol supported by the Internet is the Hyper Text Transport Protocol ("HTTP"). This protocol was adopted for the communication of graphical and text information across the Internet. This form of communication became more popular as client programs, known as web browsers, became commercially available and user friendly. Accordingly, many computer users obtained commercially available browsers so they could "surf" the Internet and obtain files from servers coupled to the Internet which were written in the Hyper Text Mark-up Language ("HTML"). Today, many computers are provided with web browsers without requiring user installation.

Companies or individuals which couple servers to the Internet for providing product and service information to potential customers recognize that more than just a few files can be maintained at the site for user access. Specifically, server operators use a server coupled to the Internet to provide queries from users communicated in the HTTP or other Internet protocol to a "gateway". A gateway can be an application program or a separate system which converts user queries from an Internet protocol to one compatible with a database coupled to the gateway. If more than one database is coupled to the gateway, the gateway performs the function of converting the user queries to the appropriate query language format for the database coupled to the gateway. Most databases coupled to a gateway are relational databases which may be accessed according to an open database compliant standard ("ODBC"). Companies which maintain data records in non-relational databases also want to present information to users over the Internet. These non-relational databases are commonly known as legacy databases as they are viewed as a legacy left from the period preceding relational data base usage.

One model developed for providing access to legacy databases over an open network, such as the Internet, is a three tier model. In the three tier model, a database interface is provided for communicating with the database management system which operates and controls the legacy database or other back end processor. A client interface for communicating with a client program executing on a user's computer is also a component of the three-tier system. Interposed between the database interface and client interface is a business logic component. The business logic component processes client requests received by the client interface with data obtained from a legacy database through the database interface. The database interface converts data received from a legacy database to a format compatible with the business logic component and converts the data requests generated by the business logic component to a format compatible with the legacy database.

While the three tier model provides user access to a legacy database, it too suffers from limitations. For one, if the number of users communicating with the client interface is significant, the business logic component may generate more data requests than the legacy databases can process. This is hardly surprising as these databases were developed to process data requests from a smaller number of users. For example, a bank database expected requests from a limited number of users—i.e., the number of tellers—rather than the number of bank customers which is possible for a system accessed via the Internet. As a result, the legacy databases may not be able to provide responses quickly enough to support real time customer interaction. Most known three-tier systems, as a result, either store user commands for batch processing at a later time or store them in a queue for near-time processing of account information requests. That is, user directed financial transaction commands were stored for batch processing by the legacy databases and account inquiries were supplied by the database interface to the legacy database through a queue to buffer the requests during periods of high demand. Thus, the limitations of legacy databases made real time execution of user commands difficult in systems where access to the system was made available to a large number of users. Because the user commands are processed in batch mode, legacy databases were updated to reflect user commands overnight and, in some instances, where several legacy databases had to be updated to clear a transaction, the user might not be able to see the transaction reflected in the user's account for several days. Unless a user maintains a record of the transaction requests submitted earlier to the system, the user may make financial decisions based on erroneous information.

What is needed is a three tier system that provides bank customers access to a legacy database over an open network without requiring storage of customer transaction commands for batch processing.

What is needed is a three tier system that supports real time execution of customer transaction commands that require data from more than one legacy database.

What is needed is a system which provides bank customers with real time access and execution of transaction commands over an open network without modifying a legacy database management system to support an increased number of users.

SUMMARY OF THE INVENTION

The above limitations of previously known systems are overcome by a system and method made in accordance with the principles of the present invention. The inventive system includes a client interface for communicating messages between a client program and an application service which processes client messages, a host interface for coupling the application service to a host system, and a local data memory coupled to the application service, the local data memory is used to store host data received through the host interface so the application service can process client messages with the data stored in the local data memory and the application service also provides update data generated during client message processing to the host system through the host interface so that host system updating and client message processing are decoupled whereby response time is improved.

The local data memory coupled to the application service provides a repository for all of a user's data retrieved from one or more legacy databases coupled to an application service through the host interface. When a client program initiates a logical session to access the system through the client interface, a refresh application service queries the host system through the host interface for the user's data records. Some of the responsive data is stored in the local memory while other responsive data is used to update data from another legacy database. The data in the local data memory is used to process client requests without requiring real time responses from the legacy database. After a transaction application service processes a client request, the local data memory and corresponding legacy database are updated. This structure permits a user's information to be stored in a data structure that does not suffer the response time delays normally encountered in legacy databases. Additionally, the decoupling of the legacy database updates from the client message processing and local data memory updating supports legacy database updates in a real time or near time manner. Thus, the bank's databases are updated and maintained without significantly impacting the ability of the system to respond in substantially real time to client messages once the local data memory is refreshed at the start of a logical session.

In a more detailed aspect of the invention, the client interface includes personality logic for converting client requests and system response data between a client program protocol and an application service protocol. Specifically, presentation logic in the client interface organizes the system responses and prepares it for rendering at the user's computer. If the user's computer is executing a fat client program, such as a personal financial program like Quicken, the client program does most of the rendering processing and the personality logic need not perform much of the rendering processing. In user computer executing their clients, such as web browsers like Netscape Gold Navigator, relatively little rendering is performed by the client. As a result, the personality logic does most of the rendering in its generation of a description language, such as the HTML document or documents, returned to a user. In the preferred implementation, a plurality of client interface service applications are provided on a web server. Each client interface service may have a different personality logic and the selection of a client interface service for communication with a client program depends upon the types of client programs attempting to access the system.

The client interface services also include personality libraries for converting client messages between the language supported by a client program and the language used to implement an application service. For example, a client program may provide client messages or requests in JAVA, Active X, or other language commonly encountered on the Internet. After the presentation logic passes the client message to obtain data for invoking an application service, the personality library converts the data and invoking command to the implementation language for the invoked application service. This structure permits the application services to be written in a variety of programming languages without requiring the application service or its application program interface (API) to include conversion processing. Instead, the presentation logic and personality library permit the client interface to be flexible regardless of the implementation of the client program or application service.

The application services of the present invention are application programs that perform end user services such as bill payment, retail banking transactions, and credit card account support. Multiple copies of the application services are provided to increase the availability of a service for a client program. By segregating different functions of an end user service into different application services, the application services may be modified and updated in an independent manner. Application services may be implemented in different languages such as object oriented languages like C++ or procedural languages like C. The application services may reside on the same computer or server as the interface to the local data memory or one or more application servers may be provided for application services and the application servers are coupled between the web server or servers on which the client interface services reside and the local database interface server.

In a preferred implementation of the present invention, the local data memory is an open relational database managed by an open relational database management system or interface. The preferred open relational database management system uses a dynamically configurable pool of database server processes, called virtual processors, and multiple concurrent threads to service multiple application services. This type of architecture permits the local data memory to communicate with a plurality of client programs through a plurality of application services at substantially the same time. Also, the database management system in the preferred implementation supports embedded query language statements for the application service protocols used for the application services. This feature permits the application services in local data memory to be efficiently integrated with the database management system for support of client message processing by the application services. If the application services are implemented in an object oriented fashion and the local data memory is a relational database or vice versa, a database interface for converting data between the two is provided.

In another aspect of the present invention, the system is provided with an information server and a server for supporting known Internet services for customer service representatives. Client messages received over an open network are first passed through a filtering router and delivered to a server on which the client interface and application services are resident, if the client messages are to be processed by an application service. Client messages which are in the format of a known internet service, such as E-mail, file transfer protocol (FTP), or Telnet messages, are delivered to a proxy firewall before being delivered to the server which supports the Internet service. Because the client interface provides a secure communication to the application services, the additional security processing of the proxy firewall is not required for this server. Thus, the structure of the system of the present invention only provides the additional overhead associated with proxy firewall processing with those services which require these additional security measures provided by such known devices. That type of processing is redundant and therefore does not enhance communication security for the system. In fact, the additional processing of the proxy firewall causes delay in the response time of the application services so it is eliminated. This structure is counter to that normally recognized within the computer network security art which generally recognizes that all servers should receive messages from proxy firewalls to enhance security.

These and other advantages and benefits of the present invention may be ascertained from the detailed description of the invention presented below and the drawings discussed therein.

BRIEF DESCRIPTION OF THE DRAWINGS

The accompanying drawings, which are incorporated and constitute a part of the specification, illustrate an embodiment of the present invention and, together with a general description given above in the detailed description of the embodiments given below, serve to explain the principles of the present invention.

DETAILED DESCRIPTION OF THE INVENTION

Figure 1:
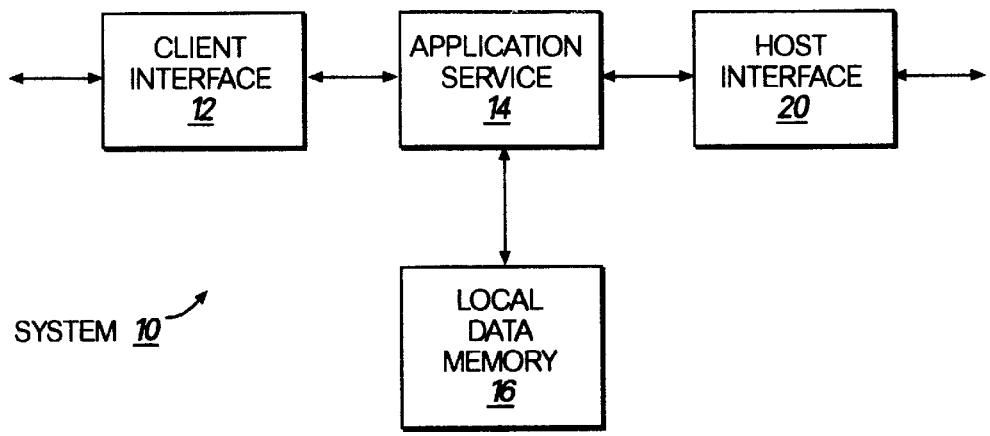
FIG. 1 is a block diagram of the components of a system made in accordance with the principles of the present invention.

A system made in accordance with the principles of the present invention is shown in FIG. 1. System 10 includes one or more client interfaces 12 each of which communicates client requests and system responses with a client program 30 (FIG. 3) over a communication network, such as an open communication network like the Internet, in a known client communication protocol such as HTTP. Client interface 12 is coupled to one or more application services 14 which process authenticated client requests received from a client interface 12 using data stored in local data memory 16. Application services 14 may perform different customer functions which implement customer support services, such as a bill payment service, retail banking service or the like. This structure permits segregation of the components for performing the various customer services for ease of maintenance and to facilitate communication with the back end or host processing systems which communicate with system 10 through host interface 20. The back end processing systems may be a database manager for a legacy database, a conventional remotely accessible database such as a credit service database, or some other type of data repository for customer financial data or the like. Host interface 20 converts data messages between an application service protocol used to implement an application service 14 and the host protocol for a back end system coupled to system 10 through host interface 20.

Local data memory 16 supports application service 14 by providing a local data repository for storing user data records that are refreshed from the host systems through host interface 20 at the initiation of a logical session. In a manner discussed in more detail below, user data stored in local data memory 16 is updated with data from the legacy systems each time a user initiates a logical session by logging into system 10. Thereafter, application services 14 process client requests using data stored in local data memory 16, and provide legacy data update messages to host interface 20 for modification of the host system data records. Thus, local data memory 16 acts as a cache memory for user data during a logical session. Use of local data memory 16 as a cache to support processing of client requests by an application service 14 and permit decoupling of host system updates from client request processing is previously unknown. Use of local data memory 16 as a cache for user data permits system 10 to be accessed by customers over an open network, such as the Internet, in substantially real time. Consequently, a financial institution may provide end user services and timely update records in its legacy databases without delaying responses provided by application services 14 to client requests, even though the number of client programs attempting to access the system exceeds the design limits of the host systems. In order to reliably support system 10's capability to provide end user services, local data memory is implemented with a highly available platform, which means the memory and its management are implemented on hardware that is hardened or provided with redundant capability to improve its reliability.

System 40 conforms to the structure of system 10 and provides more detail for implementation of the system over the Internet. A customer may utilize a PC or any other personal digital assistant (PDA) 28 executing a client program 30 to communicate over an open network. Computer 28 may be coupled to a firewall 32 to provide a more secure communication link to Internet 34. Client requests and system responses between system 40 and client programs 30 are communicated through filtering router 44. Filtering routers are well known within the art. Filtering routers interrogate the source and destination addresses of open network messages communicated through the router to verify that the source and destination addresses conform to the requirements for communication through the router. For example, filtering router 44 does not pass communication messages through it which have a source address which corresponds to the same network for the destination address. This prevents a "spoofing" attack where a computer outside a computer network attempts to emulate another computer on the network to which the destination address computer is coupled, to exploit lower security measures for computers on the same network. Messages from client programs 30 to system 40 may be routed by filtering router 44 to an information server 48, web server 50, or customer service computer 52. Messages to customer service computer 52 preferably first pass through proxy firewall 54.

Figure 2:
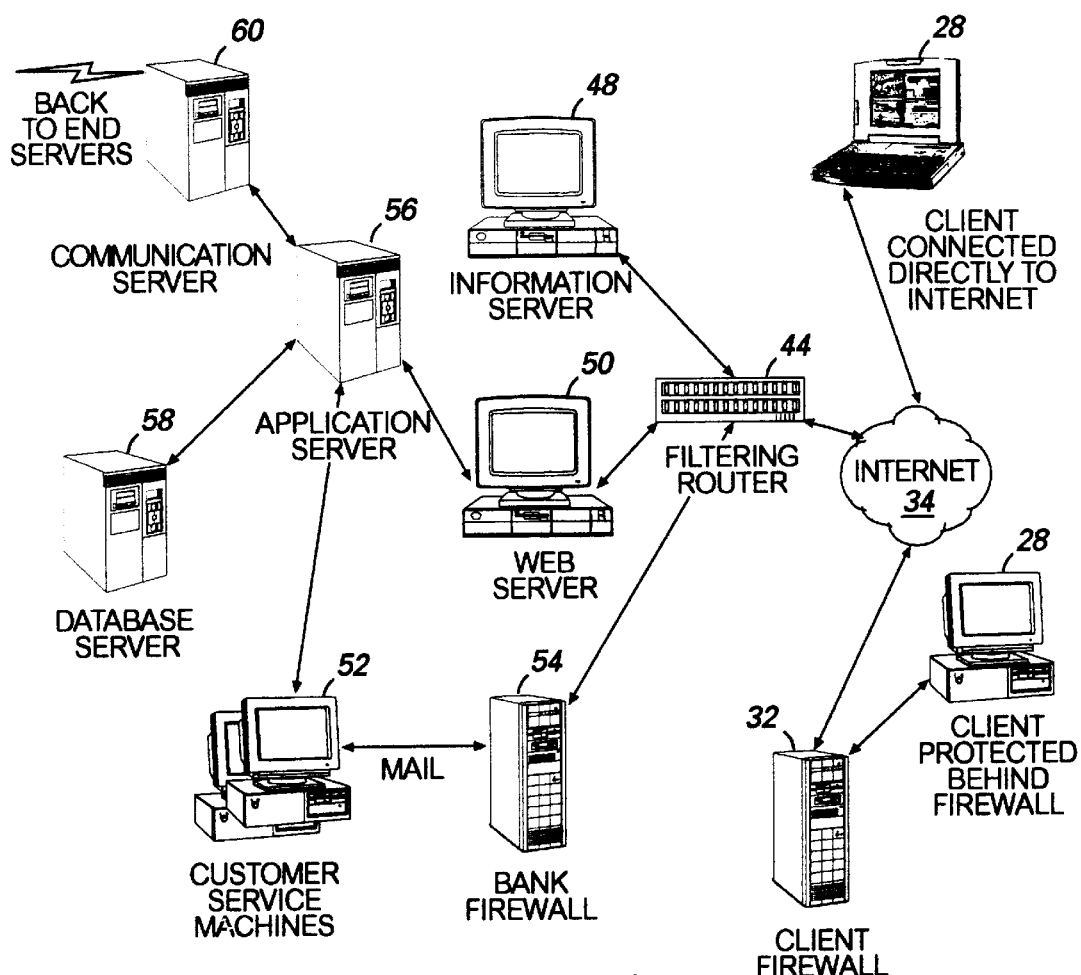
FIG. 2 is a schematic representation of a system embodying the components shown in FIG. 1.

Information server 48 contains non-confidential information and files which may be provided to a client program 30. This information and files may be related to services available once a user becomes a customer or client of the institution that supports its customers using system 40. If a user communicates with system 40 using a client program 30, the data messages include identifiers that can be tested by filtering router 44 to determine whether a data message from client program 30 is a client request which is routed to web server 50 or an Internet service message which is routed to customer service computer 52. Web server 50 may execute one or more client interface service applications, each of which implements a client interface 12 for supporting communication between system 40 and client program 30. Database server 58 includes local data memory 16 and its management interface. Database server 58 is preferably a highly available platform which means the hardware is more reliable and robust. However, such systems are more expensive than conventional computer systems. Although database server 58 may execute one or more application services 14 and one or more host interface services for host interface 20, application services 14 and the host interface services preferably reside and execute on one or more application servers 56 and one or more host communication servers 60, respectively. As discussed in more detail, servers 56 and 60 are implemented on hardware platforms that are not rated as being as highly reliable as server 58. Although the servers 56, 58, and 60 are shown coupled in point-to-point links, FIG. 2 illustrates data flow and not physical connections. Thus, the reader should appreciate that servers 56, 58, and 60 may be coupled in a ring network or other physical connecting configuration. Application services 14 process authenticated client requests received from web server 50. Application services 14 communicate with the host systems controlling access to the legacy databases or other back end host systems through host interface 20. When a user wants to communicate an Internet service message, such as e-mail, to a customer service representative, the message is provided through proxy firewall 54 to the e-mail service for delivery to a customer service computer 52. The customer service representative may then utilize information in the e-mail message to verify or correct user data through an application service 14 and local data memory 16.

Figure 3:
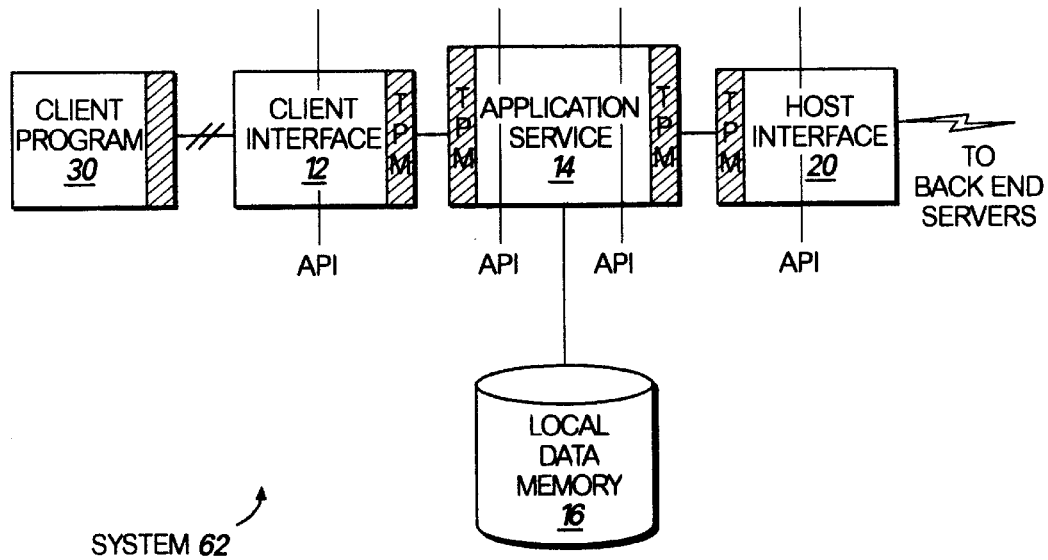
FIG. 3 is a block diagram of an implementation of a system embodying the components shown in FIG. 1.

A more detailed view of a system implementing the principles of the present invention is shown in FIG. 3. Using like numbers to identify like components, system 62 is coupled to Internet 34 through a client interface 12. As discussed above, multiple copies of client interface services, which are application programs residing and executing on web server 50, implement a client interface 12 for an application service 14. Application services 14 are application programs that typically reside and execute on one or more application servers 56. System 62 is coupled to the host systems for the legacy databases and back end processing systems through a host interface 20. As discussed above, multiple copies of host interface services, which are application programs typically residing and executing on one or more communication servers 58, implement a host interface 20 for an application service 14.

Preferably, communication between client interface 12 and an application service 14 and communication between an application service 14 and host interface 20 are implemented with a transactional processing (TP) monitor, such as the Tuxedo version 6.1 TP monitor available from BEA Systems of Sunnyvale, Calif. TP monitors are well known and include a name service that handles an application service call by identifying an available copy of an application service identified in an application call and passing the parameters from the application service call to the application program interface ("API") for the available application service. The TP monitor balances the load between the application service calls and the available application services and makes the locations of the available applications transparent to the client interface service programs and host interface service programs communicating with the application services.

In more detail, information server 48, web server 50, application server 56, and communication server 60 may be Hewlett-Packard ("HP") D250 class computers having 256 MB of RAM, a 8 GB hard drive, an associated terminal, and a CD-ROM drive. Database server 58 may be a HP D260 class computer having 1 GB of RAM, 8 GB hard drive, and associated terminal, and a CD-ROM drive. Firewall 54 may be an Interceptor Firewall/PC available from Network Technologics.

The operating system on information server 48, application server 56, database server 58 and communication server 60 may be the HP-UX operating system available from Hewlett-Packard. The HP-UX operating system is a version of the UNIX operating system. Web server 50 operates under a secure operating system, such as the Virtual Vault Operating System (VVOS) available from Hewlett-Packard. Communications with client programs 30 over Internet 34 for information server 48 are preferably supported by a Netscape Enterprise Server program resident on information server 48. Communications with client programs 30 over Internet 34 for web server 50 and proxy firewall 54 are also supported by a Netscape Enterprise Server. The Netscape Enterprise Server uses an open Secure Sockets Layer ("SSL") protocol for communication with client programs 30. The SSL protocol provides encryption, server authentication and message integrity incorporating RSA data security software. The Netscape Enterprise Server includes a Netscape Server Application Programming Interface ("NSAPI") for integrating the server software with the client interface services residing and executing on web server 50.

Application services 14 are preferably application programs written in a higher level programming language, such as C or C++. Database server 58 also includes local data memory 16 which is preferably implemented with the INFORMIX—On-line Dynamic Server, version 7.1. This is a relational database management system ("RDBMS") for managing data operations between local data memory 16 and application services 14. INFORMIX Dynamic On-line Server is a commercially available server of INFORMIX Software, Inc. of Menlo Park, Calif. The dynamic server of the preferred embodiment uses a configurable pool of database server processes and multithreading to efficiently process database commands and other messages communicated with application services 14 without delaying application service processing and communication with client programs 30. Other embodiments of local data memory 16 are possible as long as the embodiment is a highly available platform with sufficient storage and access times to provide a cache memory for user data during a logical session. For example, local data memory 16 may be an object oriented database or a RAM memory with a memory access controller. Local data memory 16 may also be implemented with more than one memory such as a database cluster. Where application services 14 and local data memory 16 are implemented with different architectures, a converting interface may be required. For example, an application service 14 written in a procedural language may require a relational/object interface if local data memory 16 is a data object repository. Likewise, such an interface may be required when application service 14 is implemented in an object oriented language such as C++ and local data memory is a relational database.

To further enhance secure communications between computers in system 62, information server 48, web server 50, database server 58 and customer service computers 52 may use a communication program which replaces the communication utilities in the various types of operating systems used in system 62. One form of such secure communication software has an access control database which contains rules regarding the types of encryption supported by the computer on which it resides, identification information for the computer user or host, permissible addresses, and other computer security network communication parameters. When communication is attempted between two computers executing copies of the communication program, the program residing on the computer initiating communication communicates with its counterpart in the other computer to identify a set of common compatible protection parameters which may be used to wrap the data in a transport encapsulation protocol for communication security. Once the common compatible security parameters have been identified, data messages not conforming to the selected security parameters cause the receiving computer to terminate the communication link with the other computer, and an audit of the message is conducted to determine the type of security breach being attempted. Such a program is commercially available from Security First Technologies of Atlanta, Ga. and is denoted by the trademark Hannah.

Use of a computer communication security program, like the one discussed above, on all computers of system 62 reduces the likelihood that a disgruntled customer service representative or other employee of the institution implementing system 62 is able to access data for which the representative or employee is not authorized. This is an important security aspect of the present invention as many lapses in communication security are those perpetrated by an employee exceeding his or her authority for whatever reason.

Firewall 54 permits customer service computers 52 which are coupled together through a computer network to utilize internet services, such as e-mail, World Wide Web, FTP, Telnet, Rlogin and Usenet in a secure manner. The system includes a network access controller that interrogates a connection request for a protected service to determine whether the request should be granted. Typically, the request is evaluated on the type of service requested and the source and destination addresses for the connection. Each Internet service may also include a proxy server as part of firewall 54 which may require special authentication prior to activating the service for the connection. After activating a service, the proxy server logs the connection and monitors the commands which are transferred between the source and destination addresses. The proxy server may disable or log specific service commands as well as information regarding the messages transferred through the connection.

As can be seen in FIGS. 2 and 3, a system made in accordance with the principles of the present invention provides Internet services for customer service computers 52 through firewall 54 while user transaction information is provided directly from filtering router 44 to web server 50. One advantage of this structure is that proxy firewall 54 processes security constraints for communication more slowly than router 44. This time difference in processing primarily arises from the additional processing of the Internet service proxies and the separation of the communication sockets so the service proxies can monitor the commands. Filtering router 44 primarily verifies that the source and destination addresses conform to communication constraints and then passes the message to the appropriate destination. At web server 50, the Virtual Vault Operating System of the preferred embodiment receives client requests which have had their source and destination address verified by router 44. The secure web server verifies the user identification data and forwards the client request to an application service 14. Because the functions performed by proxy firewall 54 are redundant in view of the security processing performed by server 50, communications are not routed through firewall 54. As a result, communication speed is enhanced by this structure without jeopardizing security.

Figure 4:
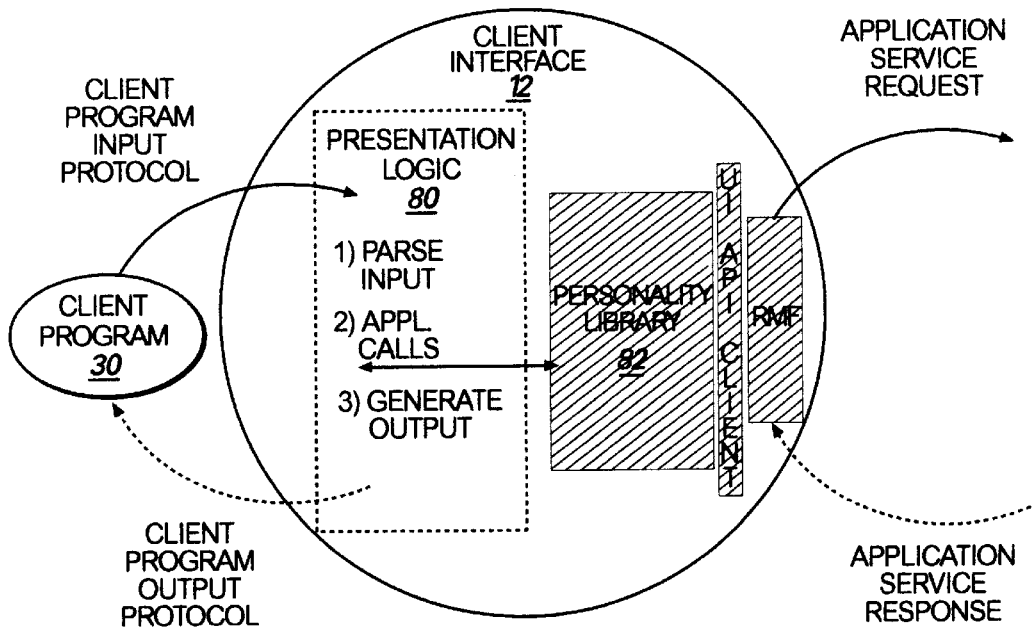
FIG. 4 is a flow diagram of data through the components of the client interface shown in FIG. 3.

A block diagram of the structure of client interface 12 is shown in FIG. 4. The interface includes presentation logic 80 and a personality library 82. Presentation logic 80 performs three functions: (1) authenticate and parse client requests; (2) make an application service call using data from parsed client requests; and (3) generate and output system responses from data returned from application services. The authentication and parsing of the client request is to verify the content of the request. This data is then incorporated in an application service call which invokes personality library 82. Personality library 82 converts data from a parsed client request to a format compatible with the API for the application service identified in the application service call. For example, client interface 12 may receive a client request in an HTML file from a client program 30. After the request is authenticated and parsed by presentation logic 80, the data from the request identifying a source account, a transfer amount, and a destination account, for example, is converted to an application service call by personality library 82. If the application service is written in an object language, such as C++, personality library 82 converts the data to an object oriented protocol for the application service. If the application service is written in a procedural language such as C, the data parsed from a client request is provided in a C programming language data structure to the API for the application service. Personality libraries 82 may be used to convert data from the application layer of the communication protocol supported by presentation logic 80 to a variety of implementation languages for application services 14. For example, JAVA, Visual Basic, C, C++, and other languages may each be supported by a separate personality library 82. The invoked application service processes the client request using data from local data memory 16 and returns response data to client interface 12. Continuing the example, personality library 82 of client interface 12 then converts the response data to a form compatible for HTML files and presentation logic 80 builds an HTML document that is sent to client program 30. Although the preferred presentation logic communicates with client programs using HTML documents, other communication protocols may be used.

The presentation of data to a user at a computer 28 is a function of user interface rendering performed by presentation logic 80 and client program 30. When client program 30 is a fat client, such as a personal financial manager program, for example, Quicken or Money, client program 30 includes software that does much of the data rendering displayed at computer 28. As a consequence, presentation logic 80 in a client interface service implementing client interface 12 for the fat client program 30, contains relatively little user interface rendering software as that function is primarily controlled by client program 30. On the other hand, when client program 30 is a thin client that performs relatively little user interface rendering, such as a commercial web browser, presentation logic 80 includes more user interface rendering software to control the presentation of data by thin client program 30. By implementing various client interface services having different presentation logic 80 and different personality libraries 82, different versions of client interface 12 may be provided to support various client programs 30 and implementations of application services 14 in different programming languages.

Figure 5:
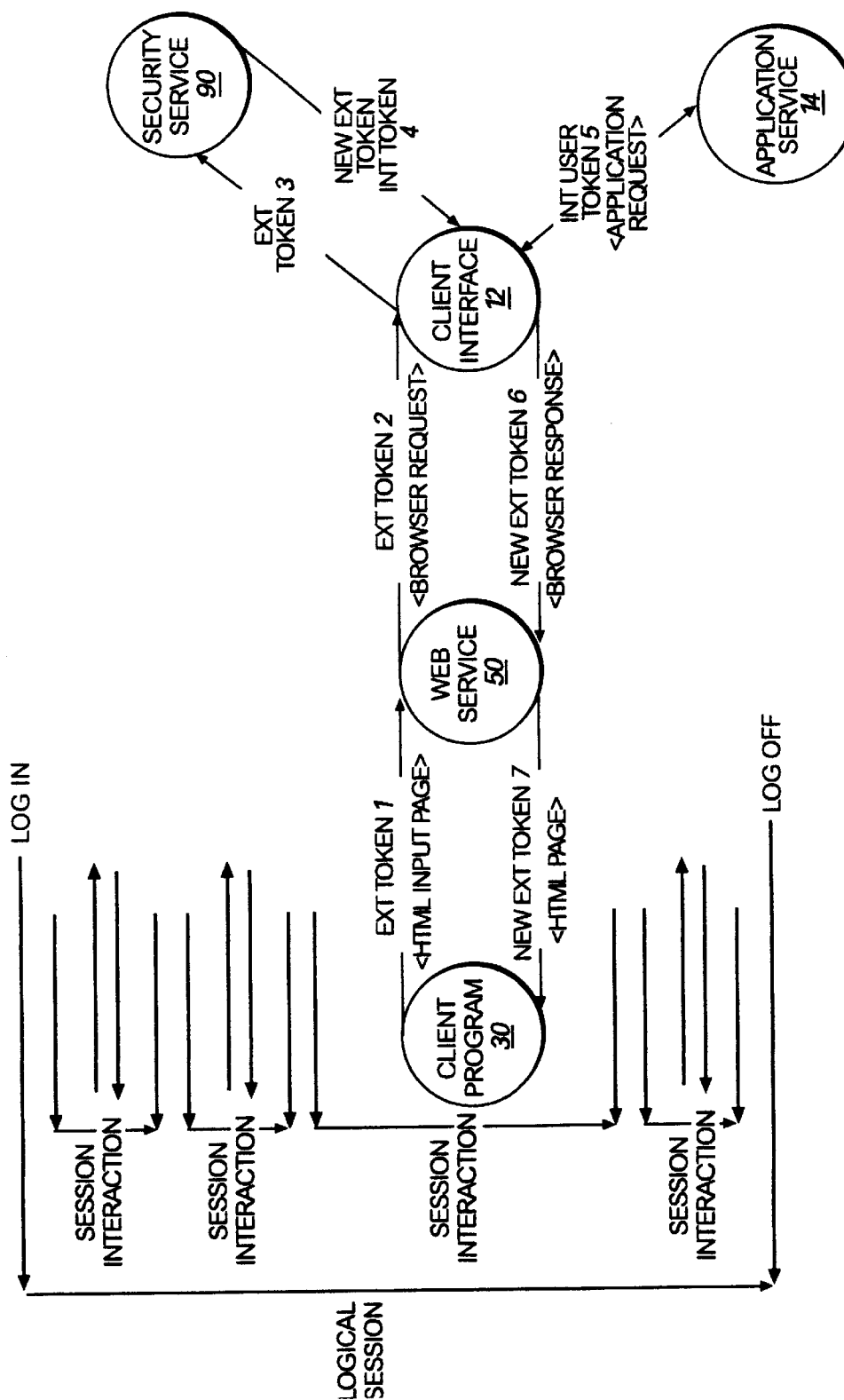
FIG. 5 is a depiction of a logical session for a user accessing the system of FIG. 3.

As shown in FIG. 5, a user logs into system 62 to initiate a logical session and then logs off to end the logical session. Because open network communication does not establish and maintain a single communication link between a client program 30 and system 62, a logical session is comprised of a plurality of session interactions. A session interaction is comprised of a client request being transmitted to a client interface 12 residing on web server 50, the processing of that client request by an application service 14, and the generation and transmission of a system response to client program 30. The session interaction is then terminated until the next session interaction is initiated during the logical session. When the last client request is a logoff message, application service 14 recognizes an end of a logical session for a user. If a logoff message is not received, which is possible as a user can simply select another web site without sending a logoff message to system 62, application service 14 recognizes the end of a logical session because web server 50 provides the login communication to the user when the user returns to web server 50. As a result, the user sends a new login client request which terminates the prior logical session and initiates a new logical session.

Identification and authentication of web server 50 and client program 30 is achieved through use of a public/private key scheme. At the initiation of a logical session, client program 30 and web server 50 authenticate one another using a known security protocol such as the Secure Sockets Layer ("SSL") protocol. Once web server 50 and client program 30 have established their respective authenticity, web server 50 examines an external token in a cookie field of a client program message to determine whether the external token has expired. If it has, client program 30 is required to send a login message to initiate a logical session with web server 50. If the external token is unexpired, the client message is authenticated by web server 50. Because known security protocols, like SSL, use a single session key for encrypting communications during a logical session, another could decipher this key, especially if it has a relatively small bit size, for example, forty (40) bits. With this information, another can decrypt the contents of the messages between client program 30 and system 62 to obtain information for generating messages that appear to be from an authorized client program 30. To reduce the likelihood of this security breach, system 62 generates a separate external token for each session interaction. Thus, even if the security protocol key is deciphered, the external token cannot be easily predicted and included in a "spoofing" message. To further enhance security within web server 50 and reduce the likelihood that an application service call is forged, an internal token is also generated for each session interaction. The new external token and internal token are provided to client interface 12 which passes the internal token along with the client request as converted by personality library 82 to application service 14. The internal user token is returned by application service 14 with response data and client interface 12 returns the response data converted to the client interface protocol along with the new external token to client interface 12. Presentation logic 80 of client interface 12 organizes the responsive data and returns it in the communication protocol compatible with client program 30 along with the new external token. For the next session interaction, client program 30 returns the new external token received from web server 50 as the external token for the next session interaction. The modification of the external token for session interaction authentication improves the security of communication between client programs 30 and system 62. The internal token is algorithmically examined without requiring access to database information. The examination is computationally efficient as the internal token is examined at each application service call. This reduces the number of accesses required for local data memory 16 and improves the response time for local data memory that would otherwise be impacted by memory accesses to verify application service calls. Interrogation of the internal token for each application service call reduces the likelihood that an unauthorized access of an application service can be obtained by forging a service call inside system 62. When the security service generates a new external token, it is stored in the local data memory so the security service can verify the next session interaction with a client program 30.

Successful initiation of a logical session results in client interface 12 generating a client refresh application service call. The refresh application service examines the user token and the configuration information for the user's records to determine which records stored in local data memory 16 require refreshing. The refresh request processed by the refresh application service may either be a user refresh request or an account refresh request. A user refresh request is processed by the refresh application server by first identifying the periodicity of data updating performed at the back end processor coupled to system 62 through host interface 20 and then querying the back end processor through the host interface if the update interval indicates recent account information might be available. For example, a user may have certificate of deposit ("CD") accounts, savings accounts, and checking accounts with the financial institution that provides customers access to their accounts through system 62. In this example, the CD accounts are updated in nightly batch processing, and savings and checking accounts are updated in real time. If the user has accessed the system since the last nightly batch processing no query for data from the back end processor of CD account information is generated. Because the savings account and checking account information are updated in real time, refresh requests are generated for both back end processors supporting this account information and the retrieved information is used to update the local data memory 16. If an account refresh is requested, the specified account for the user is obtained through the host interface 20. Data retrieved from the back end processing systems through the host interface 20 are provide to local data memory 16 to update the user data in that memory.

In banking applications, reconciliation of cleared transactions stored in a back end processing system with transaction data manually entered by a user is important for accurate accounting. This reconciliation is performed by a matching application service which identifies the transactions stored in the local data memory which have been stored as cleared transactions in the back end processing system. Changing the status of these manually entered transactions to a cleared status allows application services to accurately process client requests with the information stored in local data memory 16.

In a preferred implementation of the present invention, application services 14 may be grouped in three functions, namely, retail bank application services, bill pay services, and credit card services. The retail bank application services are processed by an account service application. The account application service may be used to obtain and edit a bank register or bank statement. A bank register shows all transactions for a user, including both cleared and pending transactions, while a statement shows only cleared transactions. A client request to view a user's register, causes account application service 14 to query local data memory 16 for all transaction records and these are returned to client interface 12 by account application service 14. Client messages to edit a record may be sent by client program 30 and processed by the account application service. A pending transaction may be edited to modify or delete payment while unclear transactions may be edited to modify or delete the transaction. The statements may only be displayed as they are only directed to cleared transactions. Account application services may also be used to perform immediate transfers between accounts. The bill pay client requests are preferably processed by a bill pay application service. The bill pay application service allows a user to make a new payment to an existing payee, define a new payee and a payment to that payee, edit information regarding a payee identify a group of payees, provide a recurring payment instruction or modification of such an instruction. The credit card client requests are processed by a credit card service application which permit the display and editing of a credit card statement.

Figure 6:
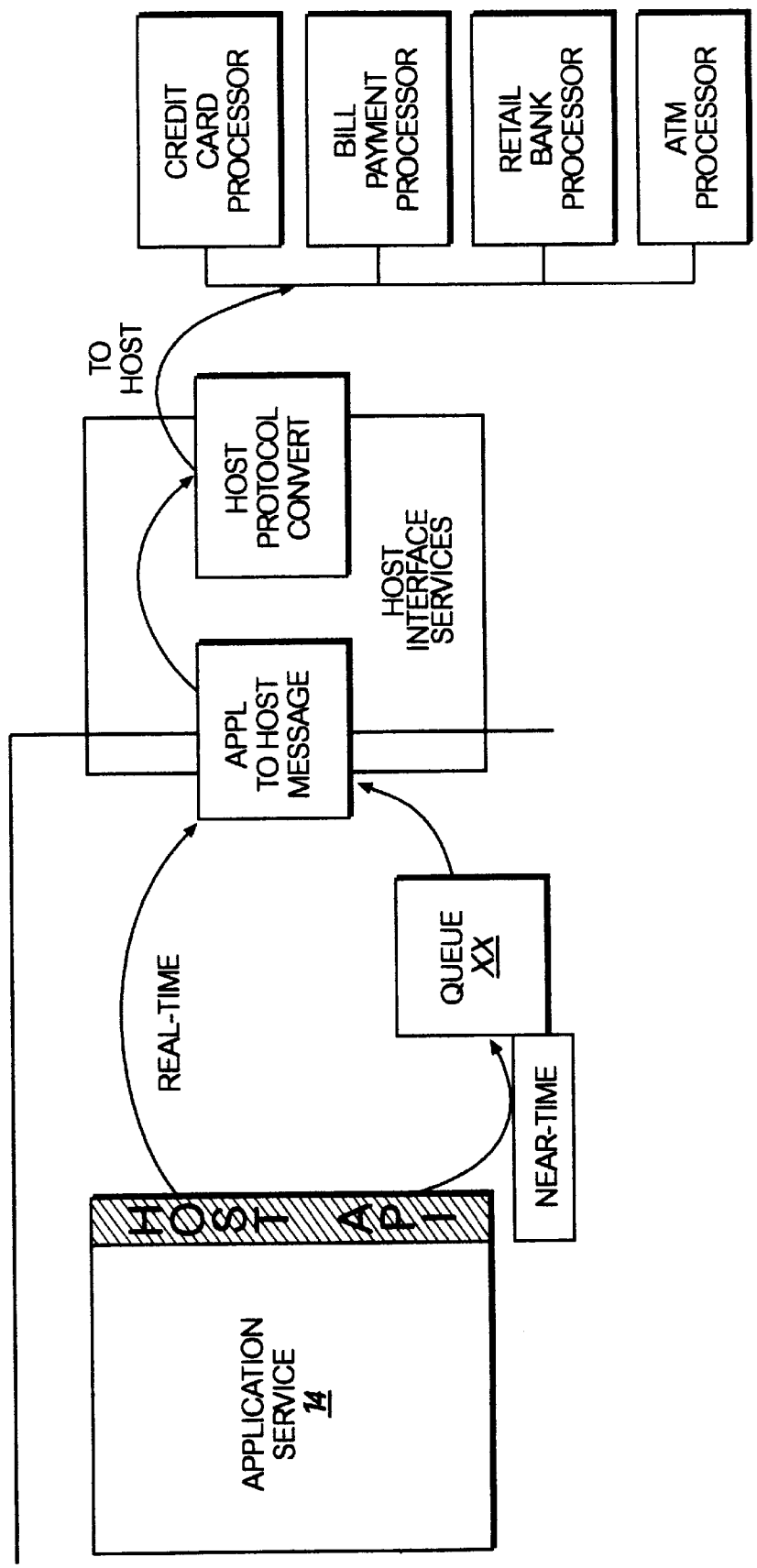
FIG. 6 is a flow diagram of data through the components of the host interface shown in FIG. 3.

Communications between a server on which application services are resident and host interface 20 are shown in FIG. 6. As shown in that Fig., an application service 14 communicates with a host interface service program for a host interface 20 in either a real time or near time manner. Preferably, all application services 14 make host interface service calls through the TP monitor discussed above. The TP monitor links the requesting application service 14 to an available host interface service. Requesting application service 14, via configuration information, determines whether the host interface service call can be provided to an available host interface API as a real time message or placed in a queue to await delivery to the next available host interface service. Host configuration information indicates whether each host coupled to a host interface 20 responds in a real time, near time, or batch mode. If the host responds in a real time manner, the host interface service call is provided to the host API so host interface 12 converts the host interface service call from the application service protocol to a message format conforming to the identified back end processing system host. This message is then encapsulated in the correct communication protocol for the identified host system and provided to the host system. Upon transfer of the message from the host API to host interface 20, application service 14 is provided with the response of the corresponding host system. If the configuration information indicates that the host responds in a near time manner, the message is placed in a queue for host interface 20 and host interface 20 processes the messages as they are emptied from the queue by a queue forwarding agent process. Host API responds to application service 14 with a signal indicating that the request has been queued to the host. If application service 14 expects no response, such as when an update message is delivered to host interface 20, application service 14 continues its processing without providing any response information to client program 30. If a response is expected by client program 30, application service 14 sends a message indicating the request is being processed and that a response from the host system can be obtained at a later time. The host configuration information of the present invention allows the host API to adapt the delivery of messages to the host interface so that those back end processing systems that respond in real time are not encumbered by those hosts that respond in near time. This also simplifies programming of the application services as all of them are written for real time responses and the API handles exception processing.

In use, an institution which implements system 62 provides the customers with a customer identifier and password through an off-line manner, such as regular mail service. Using a client program 30 on the user's client computer 28, the user may access information server 48 to gain access to non-confidential information. To review account information or to direct transactional activity, a customer initiates a logical session with system 62. Subsequent session interactions for the logical session are authenticated with the facilities of the communication security protocol as well as the external token authentication mechanism of system 62. The authenticated client requests are converted by presentation logic 80 and personality library 82 of client interface 12 to an application service call for an application service 14. At initiation of a logical session, a refresh application 14 determines those user records requiring updating and obtains user records through host interface 20. This data is then converted to a format supported by local data memory 16 and stored in local data memory 16. Application service 14 now processes client requests received in subsequent session interactions using data from local data memory 16 and returns a response to client interface 12. Application service 14 also generates host record update messages which are provided to host interface 20 for delivery to the corresponding host. Thus, the processing of client requests by application service 14 is not delayed by communication with hosts for the legacy databases and other back end processing systems, except for the initial retrieval of records, and the data integrity of the records in local data memory 16 and the legacy database is maintained.

While the present invention has been illustrated by a description of various embodiments of the present invention and while the embodiments have been described in considerable detail, it is not the intention of the applicant to restrict or anyway limit the scope of the appended claims to such detail. Additional advantages or modifications will readily appear to those skilled in the art. For example, client programs 30 may be coupled to client interface 12 through a telecommunication link in a point-to-point connectivity manner to gain the efficiencies of the three tier model with a local data memory so telecommunication connect time and charges are reduced for customer access. The inventions broader aspects are therefore not limited to the specific details, representative apparatus and method, or illustrative examples shown and described. Accordingly, departures may be made from such details without departing from the scope or spirit of applicants general inventive concepts.

What is claimed is:

1. A financial transaction system for supporting communication between a plurality of financial institution customers and at least one financial institution back end processing system comprising:

an application service program for processing client requests from a client program executing on a computer associated with at least one of the customers;

a client interface for communicating messages between said client program and said application service program;

a host interface for coupling said application service program to a back end processing system for a financial institution; and a local data memory coupled to said application service program, said local data memory for storing customer data refreshed with data received through said host interface, said application service program processes said client messages received through said client interface with said customer data stored in said local data memory.

2. The system of claim 1, said client interface further comprising:

a presentation logic program for communicating with said client program in a client program protocol; and a personality library for converting application service calls generated by said presentation logic program with data from said client messages to an application service protocol and for converting responsive data received from said application service program to said client program protocol.

3. The system of claim 2 wherein said presentation logic program parses said client messages, authenticates said client program sending said client messages, generates said application service calls with data from said client messages, and generates output for said client program.

4. The system of claim 3 wherein said presentation logic program renders output for a fat client program.

5. The system of claim 3 wherein said presentation logic program renders output for a thin client program.

6. The system of claim 2 wherein said personality library converts application service calls to one of Java, ActiveX, C, or C++.

7. The system of claim 1 further comprising:

a transaction processing (TP) monitor for coupling said client interface to said application service program and for coupling said application service program to said host interface.

8. The system of claim 7, said TP monitor having host configuration data for identifying whether said back end processing system is one of a real time and a near time system.

9. The system of claim 1 wherein said local data memory is one of a relational data base system, a data object repository, a random access memory (RAM) with a memory access controller, and a cluster data base.

10. The system of claim 1 wherein said client interface program is coupled to a plurality of client programs over an open network.

11. A method for providing financial institution customers access to their accounts at a financial institution comprising the steps of:

initiating a logical session between a client program and a client interface;

refreshing data in a local data memory with customer data received from a back end processing system through a host interface;

processing client requests using the refreshed data stored in the local data memory; and sending system responses generated from processing said client requests to said client program through said client interface.

12. The method of claim 11 further comprising the steps of:

generating back end processing system updates from processing said client requests; and sending said back end processing system updates to said back end processing system through said host interface.

13. The method of claim 11 wherein said initiating step further comprises the steps of:

authenticating said client program for access to said back end processing system; and sending secret data decrypted from a message received from said client program to authenticate said client interface to said client program.

14. The method of claim 11 further comprising the steps of:

verifying an external token to authenticate a session interaction during a logical session;

generating a new external token for authenticating a next session interaction during said logical session; and returning said new external token to said client program through said client interface.

15. The method of claim 14 further comprising the steps of:

generating an internal token during a session interaction; and passing said internal token to an application service program for authenticating an application service call.

16. The system of claim 1, wherein the customer data is refreshed with data received through said host interface in response to an initiation of a logical session by the client program.

17. The system of claim 16, wherein the application service program, responsive to the initiation of the logical session, is operative to determine the customer data that requires refreshing, obtain the data for refreshing the customer data from the back end processing system via the host interface, and store the data in the local data memory, thereby modifying content stored by the local data memory.

18. The system of claim 1, wherein the client interface generates a client refresh application service call in response to an initiation of a logical session, and the application service program is responsive to the client refresh application service call to examine a user token and configuration information for the customer to determine the customer data requiring updating in the local data memory.

19. The system of claim 18, wherein the application service program obtains data from the back end processing system to update the customer data maintained in the local data memory.

20. The method of claim 11, wherein the step of refreshing data in the local data memory comprises:

generating a client refresh application service call in response to an initiation of a logical session; and in response to the client refresh application service call, examining a user token and configuration information the customer to determine the data requiring updating in the local data memory.

* * * * *